Feb. 13, 1968    J. OPIE    3,368,278
MACHINE FOR SEPARATING CURD AND WHEY
Filed March 25, 1966    4 Sheets-Sheet 1

INVENTOR.
John Opie
BY John F. Brezina
Attorney

Feb. 13, 1968  J. OPIE  3,368,278
MACHINE FOR SEPARATING CURD AND WHEY
Filed March 25, 1966  4 Sheets-Sheet 2
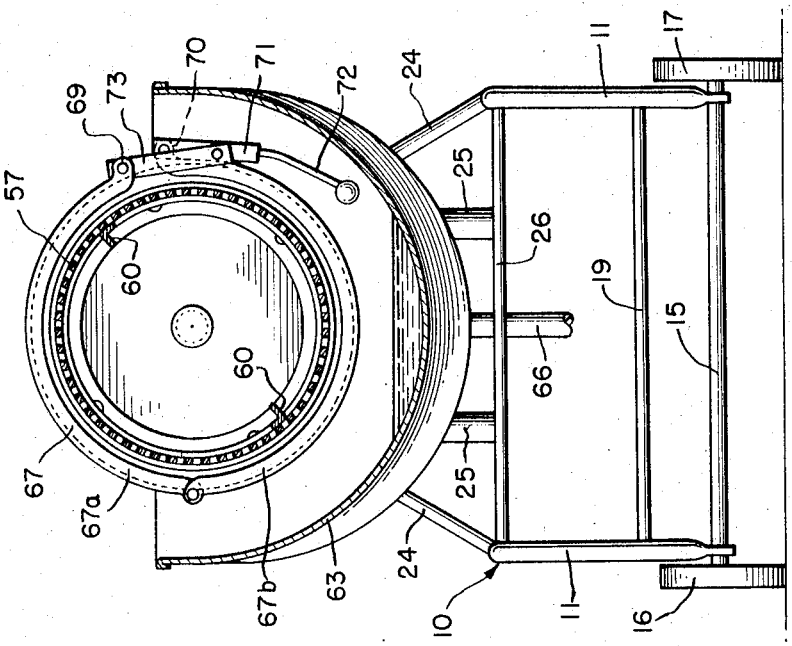
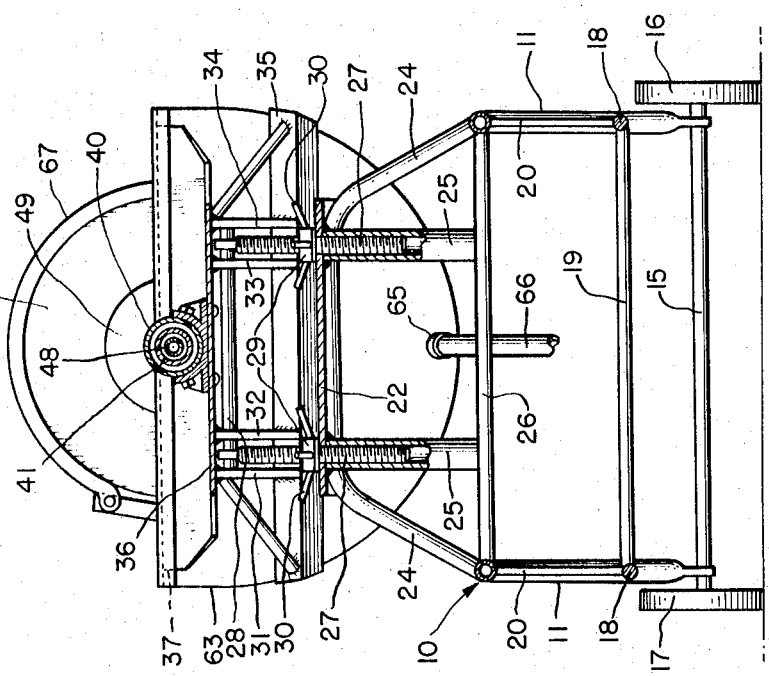
INVENTOR.
John Opie
BY John F. Brezina
Attorney

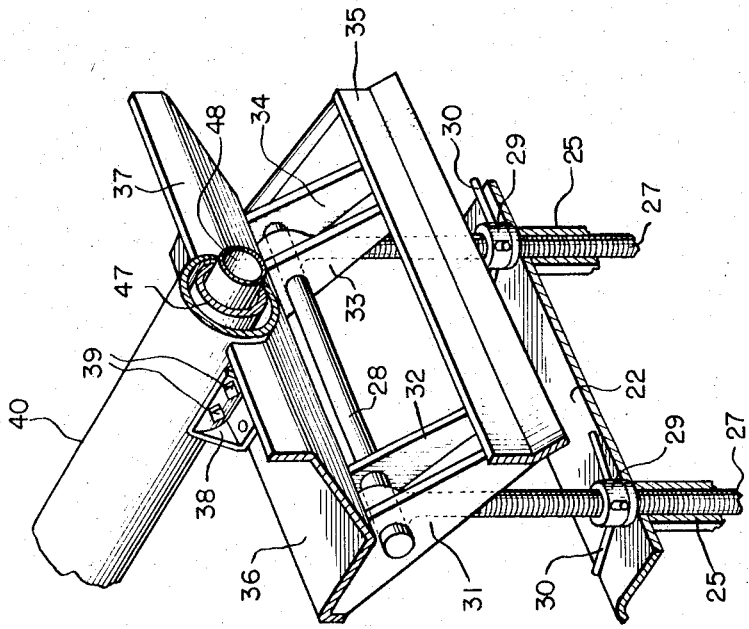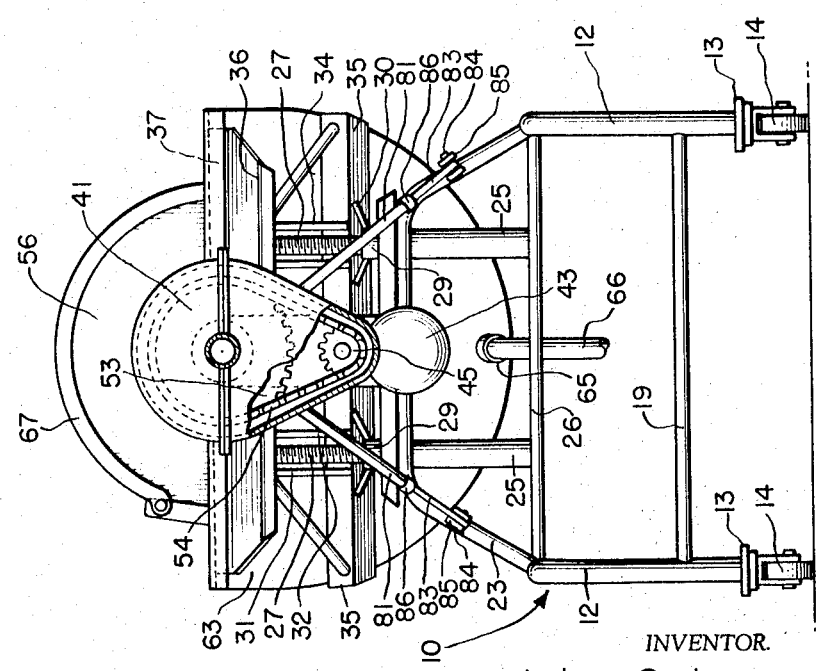

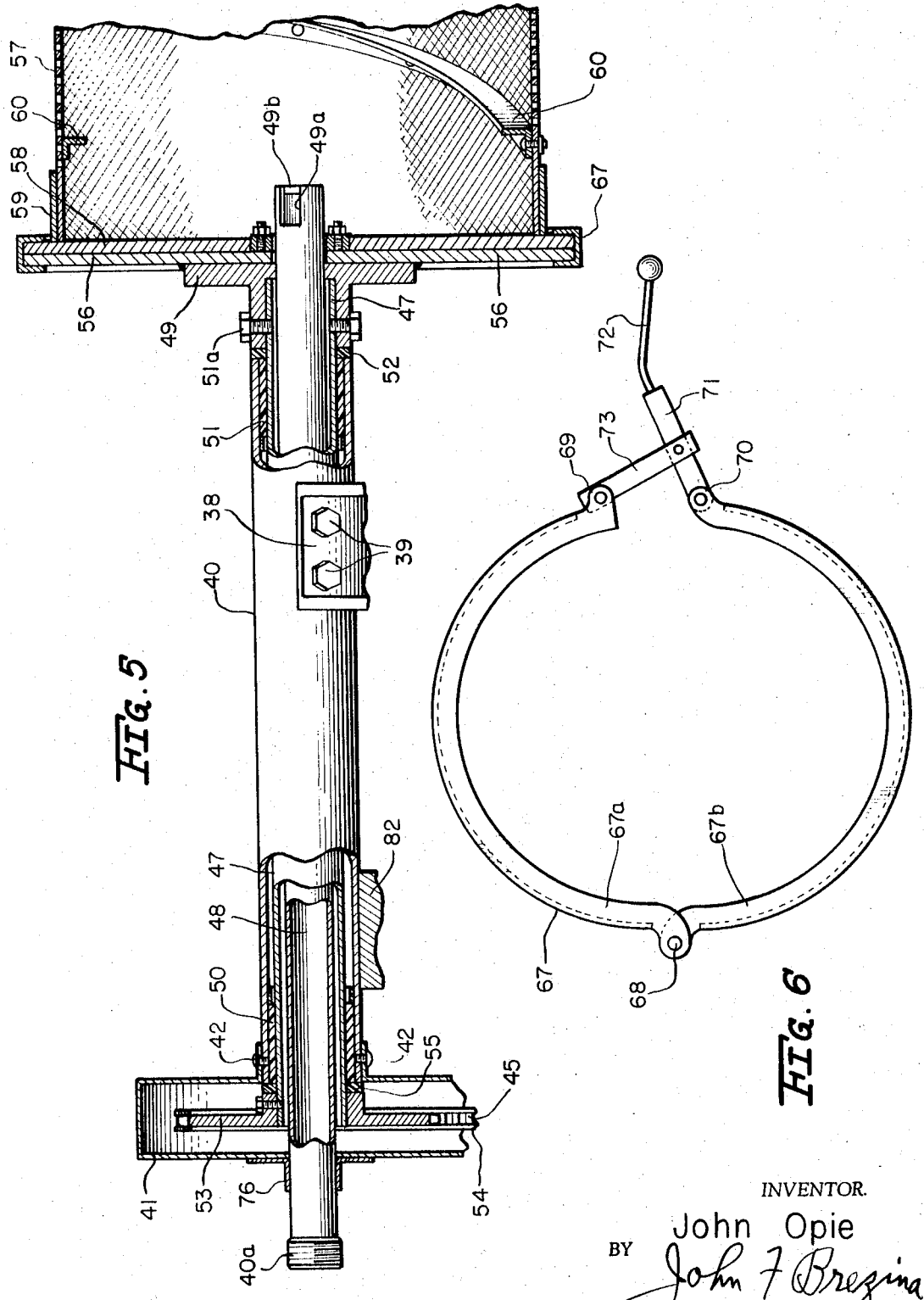

United States Patent Office 3,368,278
Patented Feb. 13, 1968

3,368,278
MACHINE FOR SEPARATING CURD AND WHEY
John Opie, 4934 S. Hoyne Ave., Chicago, Ill. 60609
Filed Mar. 25, 1966, Ser. No. 537,358
8 Claims. (Cl. 31—46)

My invention is directed to a machine for separating whey from curd by a continuous process. In the manufacture of cheese, after the raw milk contained in suitable vats has had mixed with it the usual cultures, the resulting mass partially solidfies and forms curd which normally rises to the surface of the mass in the vat leaving the liquid whey in said vats intermixed with the mass. The usual next step in such processes is to break up the curd into relatively small pieces which is usually accomplished by cutting the same with a tool having a plurality of wires thereon which when pressed through the mass of curd a number of times will cut up the curd into relatively small pieces with the objective of more easily separating the curd from the whey. Presently known methods of such separating are by hand-dipping the curd and pouring it into separate containers and this necessitates a substantial amount of labor and time.

It is an object and accomplishment of my invention to provide a power driven machine for separating the curd from the whey and discharging it into separate tanks or other containers and which includes power driven rotatably mounted perforated conveyor and separator which will agitate and convey the pieces of curd to and through the discharge end portion thereof while at the same time having means to permit the liquid whey to run off into a separate closed path and into suitable separate containers therefore. My novel machine also includes means for selectively and continuously pumping the mixture of whey and curd into an end portion of the separating conveyor means so that the pumping, feeding and separating operations may be continuous and which provides for a great saving of labor and time.

A further object of my invention is an invention of a novel machine for separating whey from curd and discharging it separately into separate containers and which includes a power driven rotatably mounted perforated or apertured drum or conveyor having means for adjustably mounting same and having a plurality of spiral vanes adapted to move the whey to and through the discharge end portion of said drum simultaneously with the continuous draining off of the liquid whey from the mass introduced into said drum, and which has a prime mover and a hollow drive shaft with removable means for connecting said drum to said drive shaft and means for transmitting the power from said prime mover to drive said shaft and rotate said drum.

On the drawings:

FIG. 2 is a partial cross sectional view taken on a plane indicated by line 2—2 of FIG. 1 and having certain parts broken away.

FIG. 3 is a cross sectional view taken on a vertical plane indicated by line 3—3 of FIG. 1.

FIG. 4 is an elevational view looking at the left and entrance end of the machine, with portions of the power transmission casing broken away, and taken substantially on a line indicated by line 4—4 of FIG. 1.

FIG. 5 is an enlarged cross sectional view, with parts broken away, taken on a horizontal plane and showing the interior parts of the housing shaft, drum and adjacent parts.

FIG. 6 is an enlarged elevational view of the releasable locking clamp for the removable drum or conveyor.

FIG. 7 is an enlarged perspective view of the adjustable mounting means and mechanism which supports the housing, shaft and other parts relative to the supporting frame.

As shown on the drawings:

Figure 1:
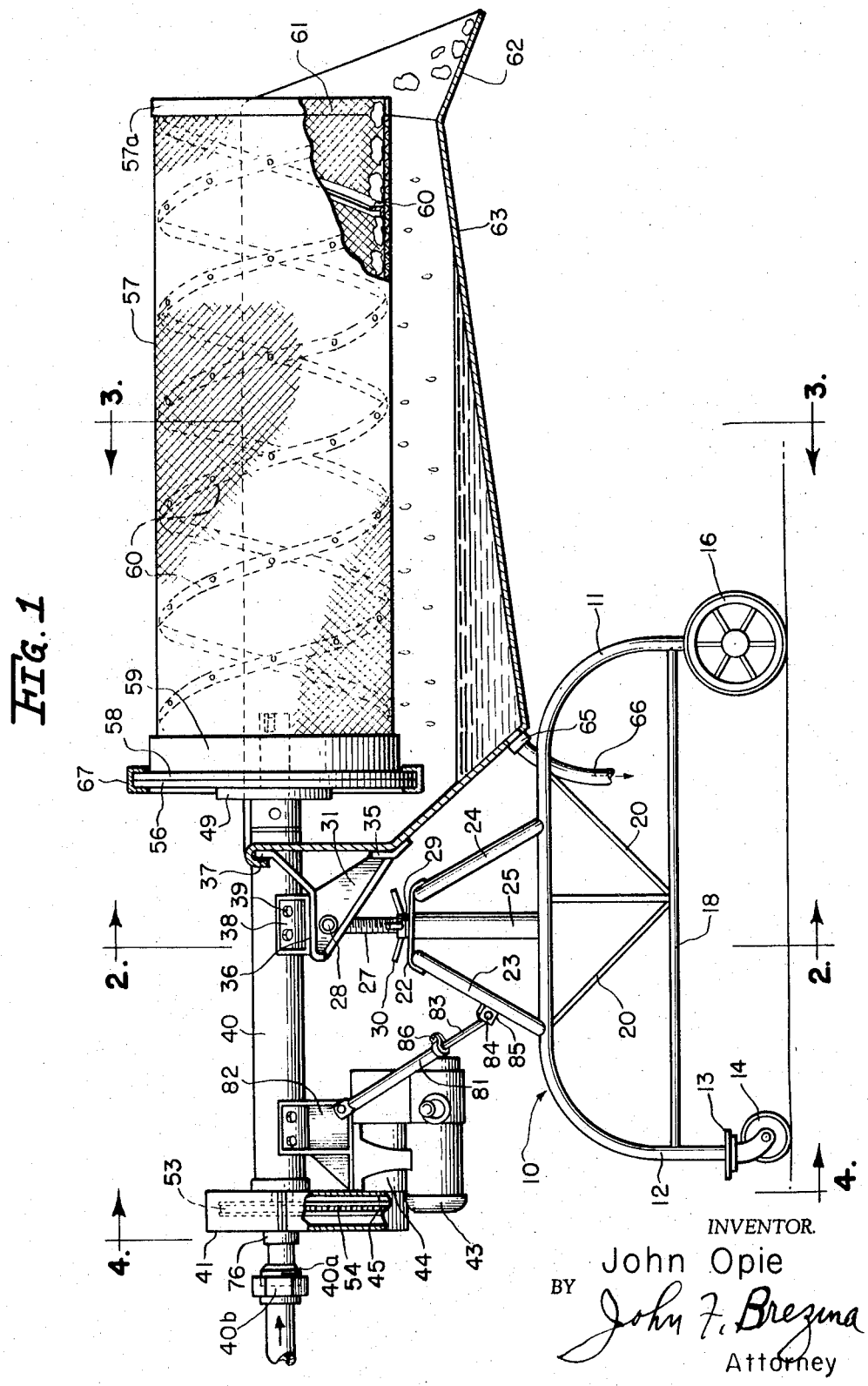
FIG. 1 is a side elevational view of my curd separating machine showing certain parts broken away and in cross section.

Referring to FIGS. 1, 2, and 3 reference numeral 10 designates generally a metal frame having two arcuate members which terminate in a pair of depending apertured legs 11 and in a pair of depending metal legs 12 as indicated in FIGS. 1 and 4. Suitably secured on the lower ends of the two legs 12 are a pair of swivel casters 13 whose journalled wheels 14 normally engage a floor.

Mounted in the aligned apertures at the lower ends of the legs 11 is a horizontal axle or shaft 15 on the opposite projecting ends of which are journalled suitable wheels 16 and 17, respectively.

Said frame has a pair of suitable longitudinal reinforcing bars 18 and a pair of transverse connecting bars 19 suitably secured, for example by welding, to the respective legs 11 and 12. Said frame also has bars of diagonally extending metal braces 20 connected at their opposite ends respectively to the longitudinal bars 18 and to the upper portion of the frame 10, as illustrated in FIG. 1.

Said frame has mounted on its upper portion an apertured metal mounting plate 22 whose edge portions are connected by diagonally extending braces 23 and 24 to the upper portion of the frame 10, as indicated in FIGS. 1, 2, and 4. As illustrated in FIGS. 1 to 4, a pair of spaced apart guide tubes 25 are secured by welding at their lower ends a transverse connecting bar 26 of the frame 10 and said tubes are secured at their upper ends respectively, for example by welding, to the cross plate 22 so that the two openings in said plate will register with the passages in said guide tubes 25, as illustrated in FIG. 2.

Mounted for vertical slide movement in said guide tubes 25 are a pair of threaded screws 27 whose upper ends are apertured, and a cross bar 28 is mounted to extend through upper apertures of said screws 27, as illustrated in FIGS. 1, 2, and 7. A nut 29 having radially extending grippable pins 30 is threadingly mounted on each of the screws 27 and provides means for selectively rotating said nuts whose lower faces slidably engage the plate 22, as illustrated in FIGS. 1, 2 and 7.

The described adjustable means for raising and lowering the conveyor and main portion of my machine provides for advantageous positioning of the inlet fitting of the coupling 49 to other devices and machines whose discharge portions may be at varied heights from the floor.

A pair of telescopic adjustable connecting links 81 have their apertured upper ends connected by suitable bolts to opposite sides of the metal saddle 82 respectively. Each of said connecting links 81 comprise an elongated tubular portion and a telescopic metal rod 83 whose lower apertured end is pivotally connected by a pin 84 to an apertured ear 85, which said ears are secured by welding to the diagonal bases 23 respectively, as illustrated in FIG. 1.

Numeral 86 designates two annular apertured metal clamps which are adjustably mounted by means of a suitable connecting bolt about the lower split end portions of the tubular portions of the links 81.

When it is desired to change and adjust the relative position of the rotatable drum or conveyor hereinafter described said clamps 86 are loosened, and the housing 40 and said conveyor and attached parts are set at desired inclination and position relative to a horizontal axis, and then the said clamps 86 are retightened to thereby cause said links 81 to maintain the housing 40 and said conveyor in the desired position.

It is to be borne in mind that when it is desired that the curd be moved more quickly to the discharge opening of the conveyor, the conveyor and said tubular housing 40 and attached parts will be secured in a more downwardly inclined position so that gravity will accelerate the forward movement of the curd to and through the discharge opening of the conveyor.

As shown in FIG. 7, the upper metal housing 40 is pivotally mounted upon the transverse saddle or cross bar 36 having an upper recessed flange 37 by means of a plurality of apertured arms 31, 32, 33 and 34, whose middle portions are pivotally mounted on the horizontal bar 28 and whose opposite ends respectively have securely mounted thereon, for example by welding, an end connecting bar 35, as illustrated in FIG. 7. Mounted on the middle portion of the mounting plate 36 is an apertured metal yoke or saddle 38 and a pair of screws 39 extend through holes in said yoke and thread into one end portion of the elongated tubular housing 40 to thereby secure said tubular housing 40.

As illustrated in FIGS. 4, 5 and 1, a metal protective housing 41 has its integral flange connected by screws 42 to one end of the housing 40. Said housing 41 extends downwardly as indicated in FIGS. 1 and 4 and covers and protects the gear and chain power transmission mechanism.

As illustrated in FIG. 1, numeral 43 illustrates an electric motor, which is connected by suitable circuit wires (not shown) to an electric power source (not shown) and said motor 43 has operatively connected to it a speed reducer 44 which is secured to a metal saddle 82 secured to housing 40, and whose projecting shaft has mounted on it a pinion 45, as illustrated in FIGS. 1 and 4. An electric control switch (not shown) is interposed in the circuit wires of said motor.

An elongated relatively large tubular shaft 47 has one end portion thereof journalled in a sleeve bearing or ring bearing 50 secured on one end portion of housing 40. Said shaft 47 extends through the tubular housing 40 and it is also journalled in ring bearing 51, as shown in FIG. 5, and it is connected to a flanged mounting bushing 49 by screws 51a. A sealing ring 52 is mounted between bushing 49 and the end of housing 40.

Securely mounted on the end portion of the tubular shaft 47 is a toothed sprocket 53, as shown in FIG. 5. An endless link chain 54 is mounted about said sprocket 53 and about the pinion 45, as illustrated in FIGS. 1, 4, and 5, and same transmits power from driven speed reducer 44 to said tubular shaft 47. A sealing ring 55 is mounted between the hub of sprocket 53 and the end of housing 40, as shown in FIG. 5.

Removably securable upon the end face of the bushing 40a is a threaded metal union 40b. Said union 40b provides a means of removably mounting and supporting a rotatable discharge pipe of supply source (not shown).

An elongated, substantially cylindrical metal drum or conveyor 57, whose cylindrical wall is foraminous and perforated has secured to its outer periphery a metal reinforcing ring 59, as shown in FIGS. 1 and 5. A metal end plate 58 is suitably secured, for example, by welding, to one edge of said ring 59 and to the end portion of the conveyor 57. Said ring has a large central aperture therein. An annular metal mounting plate 56 having a central aperture therein is secured, preferably by welding, to the bushing 49, as indicated in FIG. 5, said mounting plate 56 being rotatable with the shaft 47 and bushing 49. Mounted on the middle portion of said plate 56 is a metal centering ring 59, which is secured by two bolts or screws co-axially to the plate 56.

Said drum and conveyor 57 is removably connected to the mounting plate 56 by a channelled apertured metal clamp 67 composed of two substantially semi-circular sections 67a and 67b pivoted together by a pin 68, as shown in FIG. 6. Said clamp sections 67a and 67b, which are of U-shaped cross section, have apertured ears 69 and 70. A manually actuable lever 71 having a grippable handle 72 has one end thereof secured by a pin to ear 70, as shown in FIG. 6. A metal link 73 is pivoted to the intermediate portion of the lever 71, and its other end is pivoted to a pin extending through ear 69. It will be understood that said clamping device may selectively be mounted about the adjacent peripheries of the adjacent mounting plate 56 and the end plate 58 of said drum, and may be locked into position by movement of the lever 71 and handle 72 to contract said clamping members about the said plate 56 and end plate 58, as illustrated in FIGS. 1, 3, and 5. The said removable mounting of said drum 57 is highly important to permit proper cleaning thereof while it is removed, for example by steam jet, hot water, etc. Easy removal of said drum also has the advantage of permitting access to the hopper 63 for proper cleaning.

A metal pipe or conduit 48 having a suitable connection fitting 49 is mounted to extend through a metal bushing 76 secured upon the end face of housing 41 and the same extends through the rotatable hollow shaft 47 and through the registering apertures in the center of the mounting plate 56 and end plate 58 and through the sealing ring 77 and the same projects a short distance into the drum 57, as shown in FIG. 5.

The discharge end portion of the pipe 48, as shown in FIG. 5, normally extends a short distance into the drum or conveyor 57 and it has on it two diametrically positioned enlarged slots 49a and a partial metal end baffle 49b, as illustrated in FIG. 5.

As the mass of whey and curd pass through the pipe 48, the same partially engages the baffle 49b and is partially broken up and discharged sidewise through the slots or recesses 49a, so that thereby the curd is substantially broken up as it is discharged into said conveyor.

Said drum or conveyor 57 has secured inside of it, preferably by bolts, a plurality of inwardly extending spaced apart metal spiral strips or vanes 60, which are shown in dotted lines in FIG. 1, and portions of two of which are shown in FIG. 5. Said vanes 60 are adapted to agitate and partially rotate the mass introduced into said drum in the described manner and are adapted to gradually push and convey the semi-solid curd to and through the outlet opening 61 of said drum to cause the expelled pieces of curd to drop upon the outwardly and downwardly inclined apron or spout 62 of the metal receptacle or hopper 63. As the combined whey and curd are agitated and rotated in said drum, the liquid whey runs out by gravity through the apertures of holes in said drum.

As shown in FIG. 1, the hopper or substantially semi-cylindrical receptacle or container 63 is formed of metal and with its bottom portion gradually inclined downwardly and rearwardly toward an outlet port 65, to which port a suitable hose or pipe 66 is connected by a suitable connection fitting, as illustrated in FIG. 1, so as to cause flow therethrough of the liquid mass to vats or other containers.

The said removable mounting of said drum 57 is highly important to permit proper cleaning, thereof while it is removed, for example, by steam jet, hot water, etc. Easy removal of said drum also has the advantage of permitting access to the hopper 63 for proper cleaning.

It is to be understood that the previously described removable mounting of the tubular housing which encloses the driving shaft and other parts provides for complete and easy removal of the latter for periodical cleaning.

It is to be understood that the portability of my said machine, by virtue of the described wheels and casters, and the means providing for its vertical adjustment and positioning and for its selective adjustable inclined positioning is of great advantage and permits positioning and mounting the means to discharge portions of various other equipment and machines; and further, the said selective adjustment for inclining said machine provides additionally for regulating the speed and volume of the mass of curd and whey into said machine for the described separation.

A further important advantage and accomplishment is the increased and large volume of curd and whey which may be separated and separately discharged in the manner described.

While the foregoing specification sets forth the invention in specific terms, it is to be understood that numerous changes in the shape, size and materials may be resorted to without departing from the spirit and scope of the invention as claimed hereinafter, and it is contemplated that various changes may be made in the embodiment of the invention herein specifically described without departing from or sacrificing any of the advantages of the invention of any features thereof, and herein shall be construed as limitations upon the invention, its concept or structural embodiment as to the whole or any part thereof except as defined in the appended claims.

I claim:

1. In a machine for separating whey from curd;
    a supporting frame;
    a journalled hollow shaft;
    an electric motor;
    mechanism for transmission of power between said motor and said shaft;
    a foraminous rotatable drum connected to one end of said shaft; a whey and curd transmitting pipe mounted in said shaft having an open discharge end extending into said drum;
    means for adjusting the angular position and height of said drum and of said shaft;
    a plurality of inwardly extending spiral vanes mounted in said drum;
    an inclined hopper mounted on said frame below said drum, said hopper having a discharge opening;
    the rotation of said drum during forced introduction of a mixture of curd and whey into said pipe being adapted to agitate said mixture to drain the whey into said tank and to discharge the curd through the open end of said drum.

2. In a machine for separating whey from curd;
    a supporting frame;
    a journalled hollow shaft;
    an electric motor;
    a speed reducer operatively connected to said motor;
    gear and chain transmission mechanism operatively connecting said motor, said reducer and said shaft;
    a rotatable drum connected to one end of said shaft and having an open discharge end; said drum having a foraminous wall;
    means for adjusting the angular position of said drum;
    a plurality of inwardly extending spiral vanes mounted in said drum;
    a whey and curd feed tube mounted in said shaft, and extending into said drum;
    an inclined hopper mounted on said frame below said drum, said tank having a discharge opening;
    the rotation of said drum during forced introduction of a mixture of curd and whey through said tube into said drum being adapted to agitate said mixture to drain the whey into said tank and to discharge the curd through the open end of said drum.

3. In a machine for separating whey from curd, as recited in claim 1 and having a feed tube mounted in said hollow shaft and extending into said drum, and having traction wheels journalled on said frame.

4. A machine for separating whey and curd substantially as recited in claim 1 and having a manually releasable locking clamp for connecting said drum, and having a manually adjustable mechanism for selectively changing the inclined position and height of said tube, said shaft and of said drum.

5. In a machine for separating whey from curd substantially as recited in claim 4, and having an elongated housing in which said shaft is journalled and wherein said means for adjusting the position of said conveyor includes a pair of upwardly extending supporting screws and a pair of adjustable connecting links connecting said frame and a portion of said elongated housing.

6. In a machine for separating whey from curd;
    a supporting frame;
    a journalled hollow shaft;
    an electric motor;
    mechanism for transmission of power between said motor and said shaft;
    a whey and curd feed tube mounted in said shaft;
    an elongated substantially cylindrical rotatable apertured conveyor having spiral vanes mounted therein and receiving an end of said feed tube;
    manually releasable means for connecting said conveyor and said shaft;
    means for adjusting the relative position of said conveyor to said frame;
    an inclined elongated receptacle mounted on said frame and below said conveyor;
    the rotation of said conveyor during forced introduction of a mixture of liquid and semi-solid material through said tube being adapted to convey such semi-solid material through the discharge end of said conveyor while permitting the liquid material to flow through the apertures of said conveyor into said receptacle.

7. In a machine for separating whey from curd substantially as recited in claim 6 and having an elongated tube-like housing;
    an annular mounting plate connected to the end portion of said hollow shaft; and having means for adjustably mounting said housing relative to said frame;
    and having means for releasably connecting said conveyor.

8. In a machine for separating whey from curd as recited in claim 6 and having an annular flange mounted on one end of said conveyor;
    and a mounting plate mounted on one end of said shaft; and wherein said means for releasably connecting said conveyor includes clamping means adapted to connect said mounting plate and said flange of said conveyor.

References Cited

UNITED STATES PATENTS

| | | | |
|---|---|---|---|
| 1,475,398 | 11/1923 | Kielsmeier | 31—47 |
| 2,391,634 | 12/1945 | Lewis et al. | 68—210 X |
| 2,527,826 | 10/1950 | Kooman | 259—30 X |
| 2,709,656 | 5/1955 | Greer et al. | 99—116 |
| 2,883,166 | 4/1959 | Hilkemeier | 259—169 X |
| 2,978,229 | 4/1961 | Jackson | 259—81 X |
| 2,989,291 | 6/1961 | Bedner | 259—174 |
| 3,193,927 | 7/1965 | Ubbels | 31—46 |
| 3,279,633 | 10/1966 | Evers | 31—48 X |
| 3,292,259 | 12/1966 | Lambert et al. | 31—48 |

ALDRICH F. MEDBERY, *Primary Examiner.*